US011460331B2

(12) United States Patent
Brockhaus et al.

(10) Patent No.: US 11,460,331 B2
(45) Date of Patent: Oct. 4, 2022

(54) MAGNETIC-INDUCTIVE FLOWMETER AND MEASURING TUBE

(71) Applicant: KROHNE Messtechnik GmbH, Duisburg (DE)

(72) Inventors: Helmut Brockhaus, Oberhausen (DE); Ali-Osman Gedikli, Duisburg (DE); Maarten Hijbrand Bos, Zwijndrecht (NL)

(73) Assignee: KROHNE MESSTECHNIK GMBH, Duisburg (DE)

( * ) Notice: Subject to any disclaimer, the term of this patent is extended or adjusted under 35 U.S.C. 154(b) by 150 days.

(21) Appl. No.: 16/414,379

(22) Filed: May 16, 2019

(65) Prior Publication Data
US 2019/0368905 A1 Dec. 5, 2019

(30) Foreign Application Priority Data
May 30, 2018 (DE) ...................... 10 2018 112 897.5

(51) Int. Cl.
*G01F 1/58* (2006.01)
(52) U.S. Cl.
CPC ....................................... *G01F 1/58* (2013.01)
(58) Field of Classification Search
CPC ..................................... G01F 1/56; G01F 1/58
See application file for complete search history.

(56) References Cited

U.S. PATENT DOCUMENTS

| 6,237,424 | B1 | 5/2001 | Salmasi et al. |
| 6,694,824 | B2 * | 2/2004 | Shinmura ............... G01F 1/662 |
| | | | 73/861.29 |
| 9,091,574 | B2 | 7/2015 | Neven |
| 2005/0199073 | A1 | 9/2005 | Keech et al. |
| 2017/0122785 | A1 | 5/2017 | Wang |
| 2018/0010940 | A1 | 1/2018 | Sonnenberg |
| 2018/0017419 | A1 | 1/2018 | Rupp et al. |

* cited by examiner

*Primary Examiner* — Erika J. Villaluna
(74) *Attorney, Agent, or Firm* — David S. Safran; Roberts Calderon Safran & Cole, P.C.

(57) ABSTRACT

A magnetic-inductive flowmeter for determining the flow of a medium, having a measuring tube for guiding the medium and having two electrodes for tapping a measuring voltage induced in the medium, wherein the measuring tube has an inflow section, a measuring section and an outflow section arranged one after the other in the flow direction of the medium, the inflow section having a cross section which decreases in the flow direction, the measuring section having a constant cross section and being symmetrical with respect to a measuring section symmetry plane which runs parallel to the longitudinal axis of the measuring tube, and the outflow section having a cross section which increases in the flow direction and is formed at least partially asymmetrically with respect to the measuring section symmetry plane in order to increase measuring accuracy.

18 Claims, 5 Drawing Sheets

MAGNETIC-INDUCTIVE FLOWMETER AND MEASURING TUBE

BACKGROUND OF THE INVENTION

Field of the Invention

The invention relates to a magnetic-inductive flowmeter for determining the flow of a medium, having a measuring tube for guiding the medium along a longitudinal axis of the measuring tube and having two electrodes for tapping a measuring voltage induced in the medium, wherein the measuring tube has an inflow section, a measuring section and an outflow section arranged one behind the other as viewed in the flow direction of the medium, wherein the inflow section has a cross section which decreases in the flow direction, wherein the measuring section has a constant cross section and is formed symmetrically with respect to a measuring section symmetry plane, wherein the measuring section symmetry plane extends parallel to the longitudinal axis of the measuring tube and wherein the outflow section has a cross section which increases in the flow direction. Furthermore, the invention relates to a measuring tube for a magnetic-inductive flowmeter.

DESCRIPTION OF THE RELATED ART

Measuring tubes of the magnetic-inductive flowmeters being discussed here have an inflow section which is used to connect the magnetic-inductive flowmeters to a medium supply. The cross section of the measuring tube is usually round on the inlet side of the inflow section and is adapted to standardized tube sizes to ensure problem-free connection to the medium supply.

The measuring section follows the inflow section in the direction of flow. The measuring section is defined as the area which is penetrated by the magnetic field and in which the actual flow measurement takes place. The measuring section has a reduced cross section, which increases the flow velocity of the medium. Due to the increased flow velocity, the measuring accuracy can be increased or the measuring signal can be amplified.

If we are talking about a "reduced cross section" here, then this is a simplified, but easily understandable formulation for "reduced area of the cross sectional area". This is obvious, since without this geometric property, the flow velocity in the measuring section would not be able to be increased. The considerations made here always result in a cross section by cutting the measuring tube perpendicular to the direction of flow.

The measuring section is symmetrical in relation to a measuring section symmetry plane, i.e., it is divided into two equal parts by the measuring section symmetry plane. The measuring section symmetry plane runs parallel to a longitudinal axis of the measuring tube, wherein the longitudinal axis direction of the measuring tube is defined as the direction along which the medium flows through the measuring tube as a whole, i.e., averaged over a cross sectional area. In the case of symmetrical measuring tubes, the longitudinal axis is the center axis and symmetry axis of the measuring tube. The inflow section, measuring section and outflow section are thus arranged one behind the other along the longitudinal axis of the measuring tube. The measuring section symmetry plane therefore divides the measuring section cross section into a first partial cross section and a second partial cross section, wherein the first partial cross section corresponds to the second partial cross section mirrored at the measuring section symmetry plane. By the measuring section symmetry plane running parallel to the longitudinal axis of the measuring tube, then this does not necessarily mean that the longitudinal axis and the measuring section symmetry plane run at a distance from each other. Rather, the longitudinal axis of the measuring tube can also lie in the measuring section symmetry plane.

In some designs, the measuring section not only has a reduced cross section, but also a different cross section geometry than the inlet side of the inflow section. Rectangular measuring section cross sections are particularly preferred in the prior art. The electrodes are then preferably arranged on the short sides of the measuring section, since an increased distance between the electrodes produces an improved measuring signal.

By stating that the measuring section has a constant cross section, it is meant that the cross section is constant in terms of its area and shape.

The outflow section is adjacent to the measuring section when viewed in the direction of flow. In the area of the outflow section, the cross section increases again. At the outlet side of the outflow section, which can be connected to a medium outlet, the cross section is usually round again and corresponds to standardized pipe dimensions. By increasing the cross section, the flow velocity of the medium is reduced. This leads to a nonhomogeneous flow in the area of the outflow section, which is particularly noticeable when the flow is leaning on one measuring tube side, wherein the leaning on does not have to be on the same measuring tube side. Due to distribution of flow being nonhomogeneous, unpredictable and partly also temporally variable, measurement inaccuracy occurs when determining the flow rate.

SUMMARY OF THE INVENTION

Based on the described prior art, the object of the invention is to provide a magnetic-inductive flowmeter and a measuring tube for a magnetic-inductive flowmeter in which the measuring accuracy is increased.

The object is initially and essentially achieved by the magnetic-inductive flowmeter according to the invention in that the outflow section is at least partially asymmetrical with respect to the measuring section symmetry plane.

First, according to the invention, it has been recognized that different flow measurement values are determined, depending on which side of the measuring tube the flow is dependent upon. The invention is therefore based on the idea of forcing a dependency on a single side of the measuring tube, which is achieved by forming an asymmetrical outflow section. Since the flow of the magnetic-inductive measuring device according to the invention is only dependent on one side of the measuring tube, there are no longer different measured values, which improves the measuring accuracy of the flow compared to known magnetic-inductive flowmeters.

Generally, the measuring section has not only one, but several measuring section symmetry planes. In one design, the measuring section has an essentially rectangular cross section. If it is said that the cross section is essentially rectangular, then this includes all cross sections that have two parallel opposite longitudinal sides, whereby the short sides, which are also opposite each other, do not necessarily have to be straight sides, but can, in particular, also have a circular segment shape. In such a measuring tube, the measuring section symmetry plane parallel to a longitudinal side of the cross section is selected in one design of the magnetic-inductive flowmeter according to the invention.

The measuring section cross section is divided by the measuring section symmetry plane along its longitudinal extension.

In an alternative design, the measuring section has a square cross section, i.e., four equally long sides, each at right angles to the other. This also includes those configurations in which the corners are rounded. The measuring tube thus has an essentially square cross section. In such a configuration, a measuring section symmetry plane is preferably selected that runs parallel to one of the four equally long sides of the measuring section. In particular, a symmetry plane is not selected which intersects the measuring section diagonally, i.e., where two diagonally opposite corners lie in the measuring section symmetry plane.

However, the following designs are independent of the specific design or shape of the cross section of the measuring section and can be used for any design. It is only essential that the measuring section has at least one measuring section symmetry plane.

A particularly preferred design of the magnetic-inductive flowmeter is wherein the outflow section is asymmetrical over its entire length with respect to the measuring section symmetry plane. When the length of the outflow section is being discussed, what is meant is the extension of the outflow section along the longitudinal axis of the measuring tube.

In an alternative design of the magnetic-inductive flowmeter, the outflow section is asymmetrical with respect to the measuring section symmetry plane over a limited longitudinal extension. The outflow section thus shows asymmetry with respect to the measuring section symmetry plane only in a limited range.

According to the invention, there are various designs provided for generating the asymmetry of the outflow section in relation to the measuring section symmetry plane.

In a particularly preferred design, asymmetry is formed by offsetting the measuring section relative to the inflow section and relative to the outflow section in a direction perpendicular to the measuring section symmetry plane. Such an arrangement is particularly advantageous when the measuring section has a rectangular cross section. The asymmetry can be easily generated by offsetting the measuring section. The design has the advantage that no foreign bodies have to be introduced into the measuring tube, especially also that the flow of the medium is not disturbed by unevenness of the inner surface of the measuring tube or by foreign bodies.

In another preferred design, the asymmetry is formed by at least one insert element being arranged in the outflow section. In one design, the insert element is arranged in the outflow section of a measuring tube with the outflow section originally symmetrical with respect to the measuring section symmetry plane. In another design, the insert element is arranged in the outflow section of a measuring tube which is already asymmetrical with respect to the measuring section symmetry plane. The asymmetry is therefore reinforced by the insert element. The insert element itself is implemented in different ways. In a preferred design, the insert element is formed by an epoxy resin layer. This design has the advantage that the size of the insert element can be selected when the insert element is inserted into the outflow section.

All in all, the advantage of the asymmetry formed by an insert element is that already manufactured measuring tubes can be easily retrofitted with magnetic-inductive flowmeters, i.e., equipped with an asymmetrical outlet section.

Another preferred design is wherein the asymmetry is formed by a step-shaped elevation in the outflow section reducing the cross section. Preferably, the step-shaped elevation is designed over the entire circumference of the outflow section. In order to achieve asymmetry, the elevation on a first side of the measuring section symmetry plane is at least partially thinner than on a second side of the symmetry plane. In a preferred configuration, in which the entire measuring tube is assembled from two measuring tube parts, the step-shaped elevation is formed by the joint seam. The advantage of this design is that the joint seam, which in itself interferes with the flow of the medium, is used advantageously. When speaking of a step-shaped elevation, this elevation is not exclusively meant as a right-angled elevation. Rather, the elevation can also have an angle smaller or larger than 90 degrees or have slightly rounded corners. The step-shaped elevation reduces the cross section of the measuring tube in the area of the step-shaped elevation in the direction of flow.

In another preferred configuration, the asymmetry of the outflow section in relation to the measuring section symmetry plane is formed by a bulge in the outflow section which reduces the cross section. The term "bulge" here refers to an elevation that has a continuous course. An advantage over the step-shaped elevation in the formation of the bulge is that the vortex formation in the medium in the area of the bulge is reduced compared to the vortex formation in the area of the step-shaped elevation, since there is no reflection of the medium at the step, rather the medium flows over the bulge. In order to implement asymmetry, the bulge is only formed on one side of the measuring section symmetry plane or the bulge is greater on one side of the measuring section symmetry plane than on the other side of the measuring section symmetry plane.

The magnetic-inductive flowmeters described so far are particularly suitable for applications in which the medium flows through the measuring tube only in one direction.

Some applications require a bidirectional flow of the medium through the measuring tube. Particularly preferred designs of the inventive magnetic-inductive flowmeter therefore provide that the inflow section is also at least partially asymmetrical with respect to the measuring section symmetry plane.

In order to prevent vortex formation in the area of the measuring section, the preferred design of the magnetic-inductive flowmeter is that the inflow section is asymmetrical over its entire length. Such a design is preferred to such a design in which the asymmetry is only formed over a limited longitudinal extension. Nevertheless, the present invention also encompasses the formation of asymmetry only over a limited longitudinal extension of the inflow section.

For the design of the asymmetry of the inflow section, any design for the asymmetry of the outflow section can be implemented and applied accordingly.

In a particularly preferred design of the magnetic-inductive flowmeter, the asymmetry of the inflow section corresponds to the asymmetry of the outflow section. Both asymmetries are thus implemented in the same manner. In an alternative design of the magnetic-inductive flowmeter, the asymmetry of the inflow section is different from the asymmetry of the outflow section.

In addition to the magnetic-inductive flowmeter, the invention also relates to a measuring tube for a magnetic-inductive flowmeter. The measuring tube is used to guide a medium along a longitudinal axis of the measuring tube for a magnetic-inductive flowmeter and has an inflow section, a measuring section following the inflow section in the flow direction and an outflow section following the measuring section in the flow direction. The inlet section has a cross section which decreases in the direction of flow, the measuring section has a constant cross section and is symmetrical with respect to a measuring section symmetry plane which runs parallel to the longitudinal axis of the measuring tube, and the outlet section has a cross section which increases in the direction of flow. In the case of the measuring tube, the aforementioned object is achieved in that the outflow section is at least partially asymmetrical with respect to the measuring section symmetry plane.

The asymmetry of the outflow section of the measuring tube is particularly designed according to one of the designs already described with respect to the invention of the magnetic-inductive flowmeter. All designs made in connection with the magnetic-inductive flowmeter apply accordingly to the measuring tube according to the invention and vice versa.

In a particularly preferred design of the measuring tube according to the invention, the measuring tube is designed in such a manner that the inflow section is also at least partially asymmetrical with respect to the measuring section symmetry plane. In particular, the inflow section is asymmetrical over its entire length. The asymmetry of the inflow section is also preferably designed according to one of the designs already described with respect to the invention of the magnetic-inductive flowmeter. Here, too, the designs apply accordingly.

In detail, there is now a plurality of possibilities for further developing and designing the magnetic-inductive flowmeter and the measuring tube according to the invention. For this, reference is made to the description of preferred embodiments in conjunction with the accompanying drawings.

DETAILED DESCRIPTION OF THE INVENTION

Figure 1A:
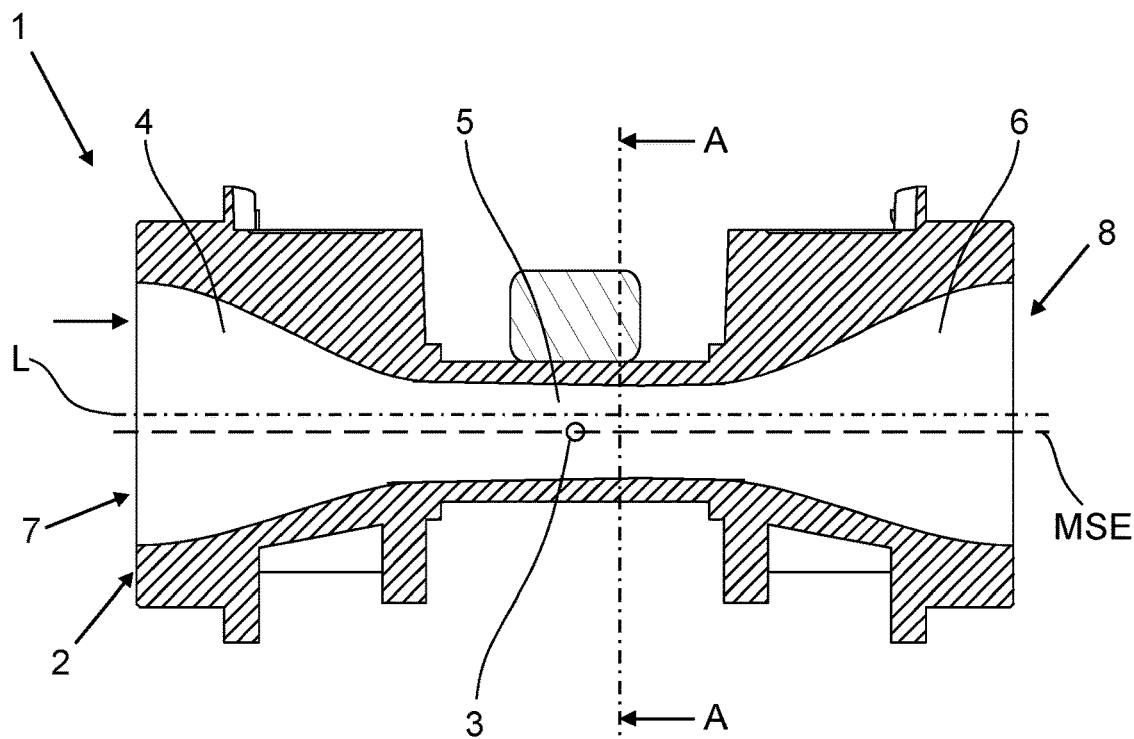
FIG. 1a shows a magnetic-inductive flowmeter having a first embodiment of a measuring tube with an asymmetrical outflow portion.

FIG. 1a shows a schematic representation of a magnetic-inductive flowmeter 1 according to the invention. The magnetic-inductive flowmeter 1 has a measuring tube 2 for guiding the medium along a longitudinal axis L of the measuring tube. Electrodes 3 are used to tap a measuring voltage induced in the medium. The measuring tube 2 has an inflow section 4, a measuring section 5 and an outflow section 6 when viewed one after the other in the direction of flow of the medium, which is indicated by an arrow directed toward the inflow section 4. The inflow section 4 has a round cross section on its inlet side 7. The cross section decreases over the extent of the inflow section 4.

In the area where the inflow section 4 merges into the measuring section 5, the cross section of the inflow section has a rectangular shape. The cross section does not change over the length of the measuring section 5, so that the entire measuring section 5 has a rectangular cross section with a constant cross-sectional area.

Figure 1B:
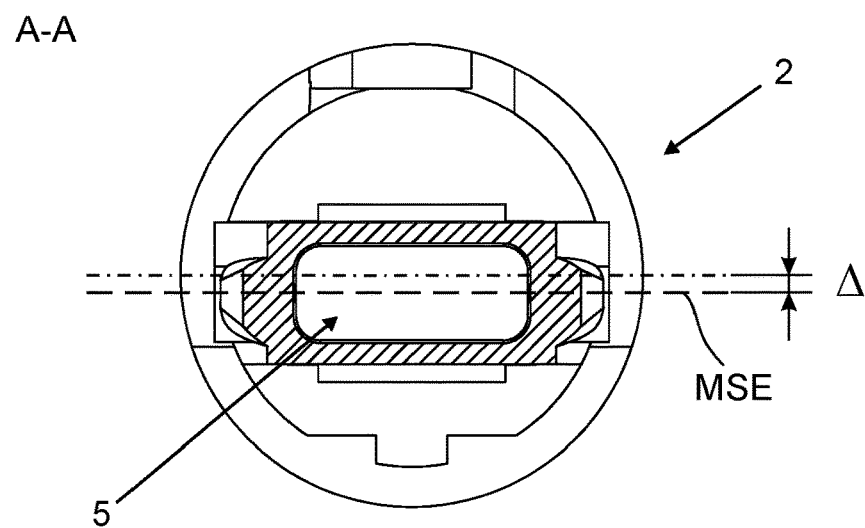
FIG. 1b is a cross section through the measuring tube of the magnetic-inductive flowmeter shown in FIG. 1a, FIG. 2a shows a second embodiment of a measuring tube with an asymmetrical outflow section.

Only in the area of the outflow section 6 does the cross section increase again and also change in shape, so that the outflow section 6 has a round cross section on its outlet end 8. The measuring section 5 is symmetrical in relation to the measuring section symmetry plane MSE, wherein the measuring section symmetry plane MSE lies parallel to the longitudinal axis L of the measuring tube 2. In the embodiment shown, the longitudinal axis L of the measuring tube 2 does not lie in the measuring section symmetry plane MSE. This results from the asymmetry of the outflow section 6 with respect to the measuring section symmetry plane MSE being formed such that the measuring section 5 is offset relative to the outflow section 6 and relative to the inflow section 4 in a direction perpendicular to the measuring section symmetry plane MSE—here downwards—by a displacement A. The displacement A can be seen very well in FIG. 1b, in which the section through the measuring tube 2 along the line A-A is shown. The shifting of the measuring section 5 also results in an asymmetrically formed inflow section 4. The measuring tube 2 of the magnetic-inductive flowmeter 1 shown is therefore also suitable for a bidirectional flow of the medium.

Figure 2A:
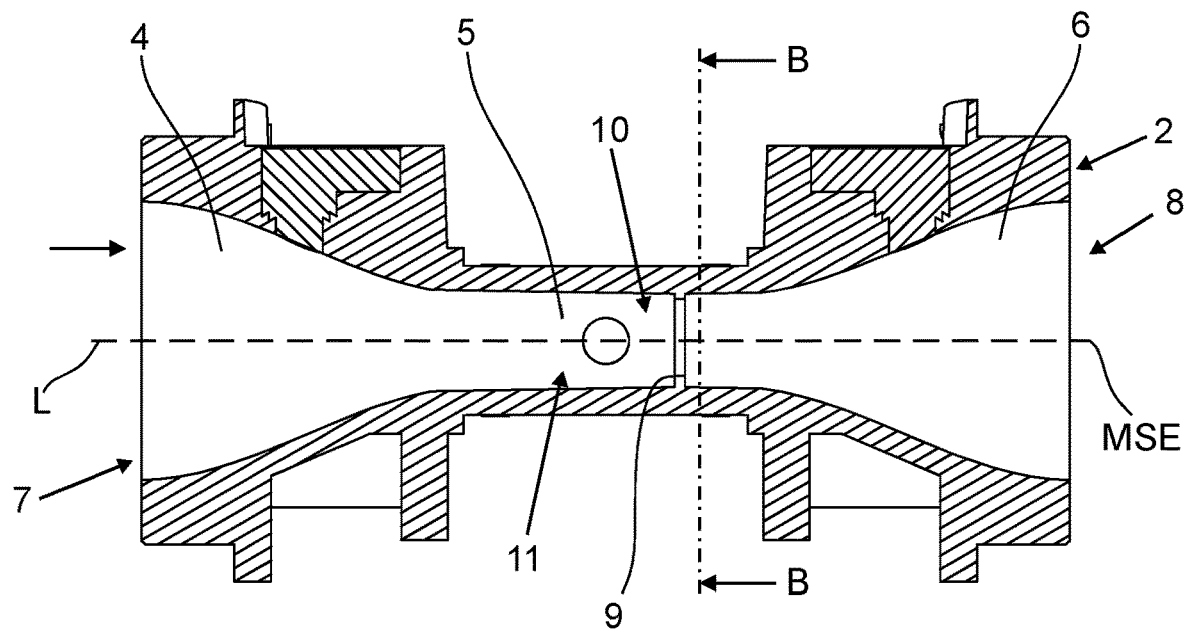
FIG. 2b is a cross section through the measuring tube from FIG. 2a, FIG. 3a is a schematic representation of a third embodiment of a measuring tube with an asymmetrical outflow section.
Figure 2B:
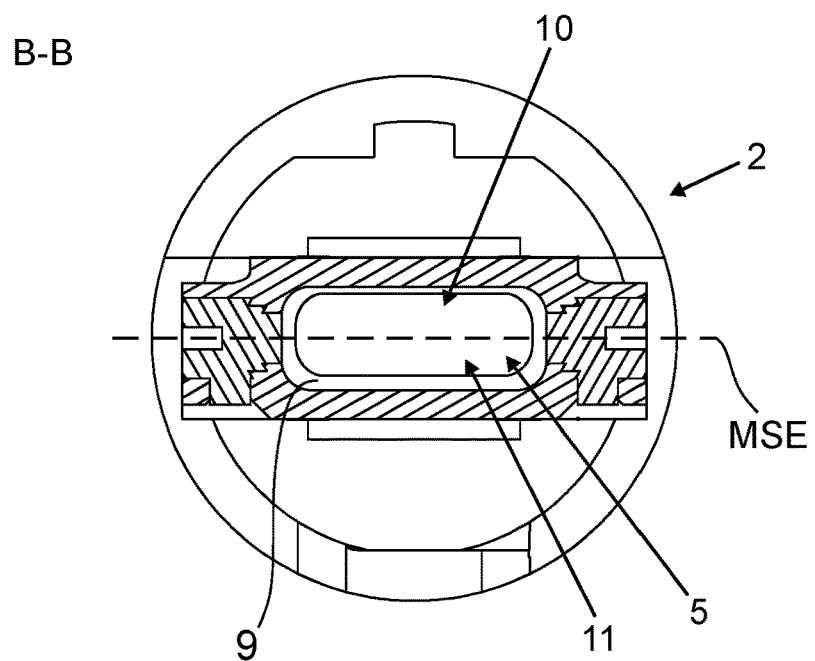

FIG. 2 shows a measuring tube 2 which only has an asymmetrical outflow section 6. It is important to note that the measuring section 5 is defined as the area of the measuring tube which is penetrated by a magnetic field and in which the actual measurement takes place. This area has a constant cross section over its entire extension. The measuring section 5 of the measuring tube 2 from FIG. 2a ends before the step-shaped elevation 9. The step-shaped elevation 9 is arranged in the area of the outflow section 6. As can be seen both in FIG. 2a and FIG. 2b, which show a section along the line marked B-B in FIG. 2a, the step-shaped elevation 9 extends over the entire circumference of the outflow section 6 and causes a reduction of the cross section of the measuring tube in the area of the step-shaped elevation 9. In the example shown, the cross section of the measuring tube 2 as seen in flow direction before the step-shaped elevation 9 corresponds to the cross section of the measuring tube 2 as seen in flow direction after the step-shaped elevation 9. The asymmetry is achieved in that the step height on the first side 10 of the measuring section symmetry plane MSE is lower than on the second side 11 of the measuring section symmetry plane MSE. In the design shown, the longitudinal axis L of the measuring tube lies in the measuring section symmetry plane MSE.

Figure 3A:
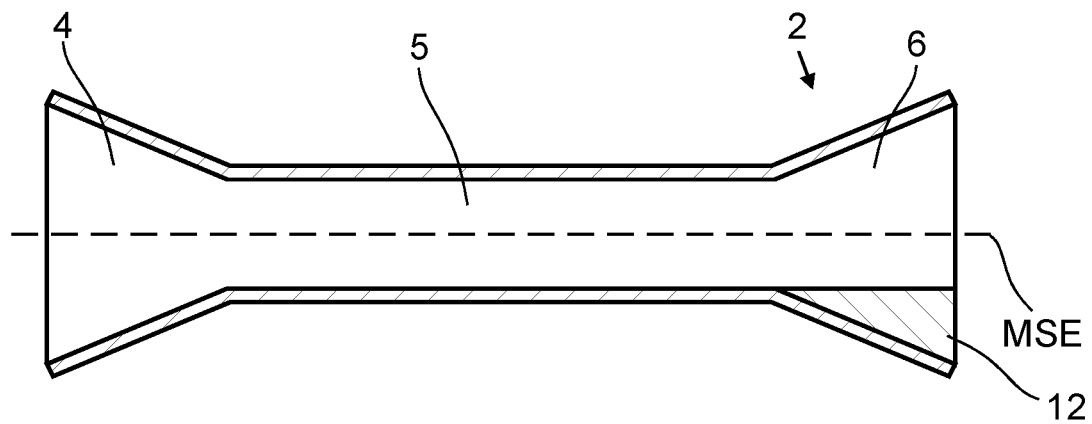
FIG. 3b is a schematic representation of a fourth embodiment of a measuring tube with an asymmetrical outflow section.
FIG. 3c is a schematic representation of a fifth embodiment of a measuring tube with an asymmetrical inflow section and an asymmetrical outflow section.

FIG. 3 shows schematic representations of different measuring tubes 2 in cross section. The measuring tubes 2 each have an inflow section 4, a measuring section 5 and an outflow section 6. FIG. 3a shows a measuring tube 2 in which the asymmetry of the outflow section 6 with respect to the measuring section symmetry plane MSE is formed by an insert element 12 arranged in the outflow section 6.

Figure 3B:
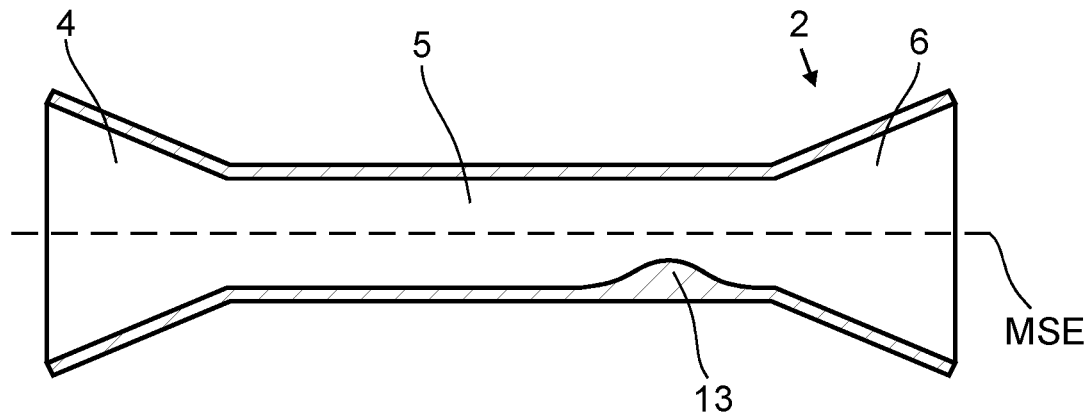

For the measuring tube 2 shown in FIG. 3b, the measuring section ends before the bulge 13, which reduces the cross section and is located in the area of the outflow section 6. The asymmetry of the outflow section 6 of the measuring tube 2 shown in FIG. 3b is thus formed by the bulge 13. The bulge 13 leads to a reduction of the cross section in the area of the bulge 13. In the example shown, the cross section of the measuring tube 2 as seen in the flow direction before the bulge 13 corresponds to the cross section of the measuring tube 2 as seen in the flow direction after the bulge 13.

Figure 3C:
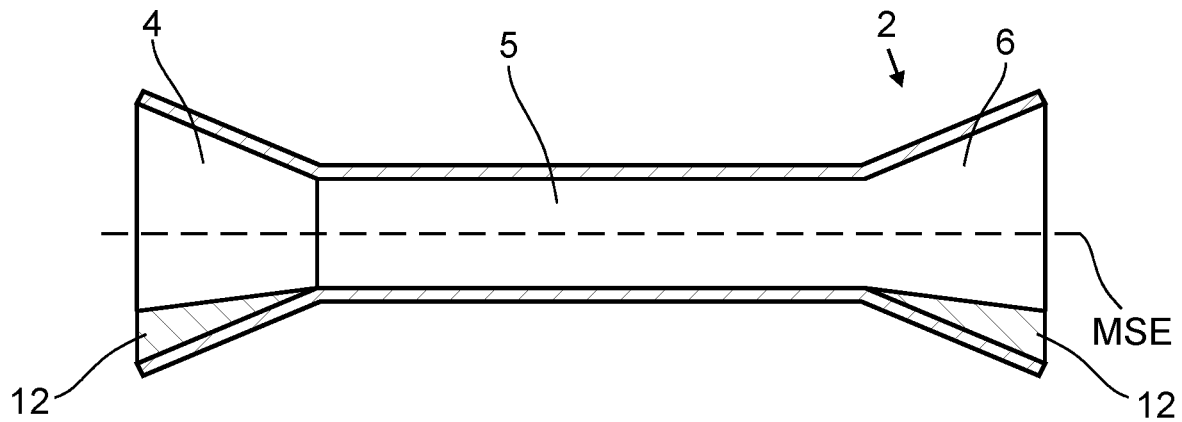

FIG. 3c shows a measuring tube 2 in which both the outflow section 6 and the inflow section 4 are asymmetrical with respect to the measuring section symmetry plane MSE. The asymmetries of both sections are formed by the arrangement of insert elements 12. In contrast to the insert element 12 shown in FIG. 3a, the insert elements 12 shown in FIG. 3c are thinner.

Figure 4:
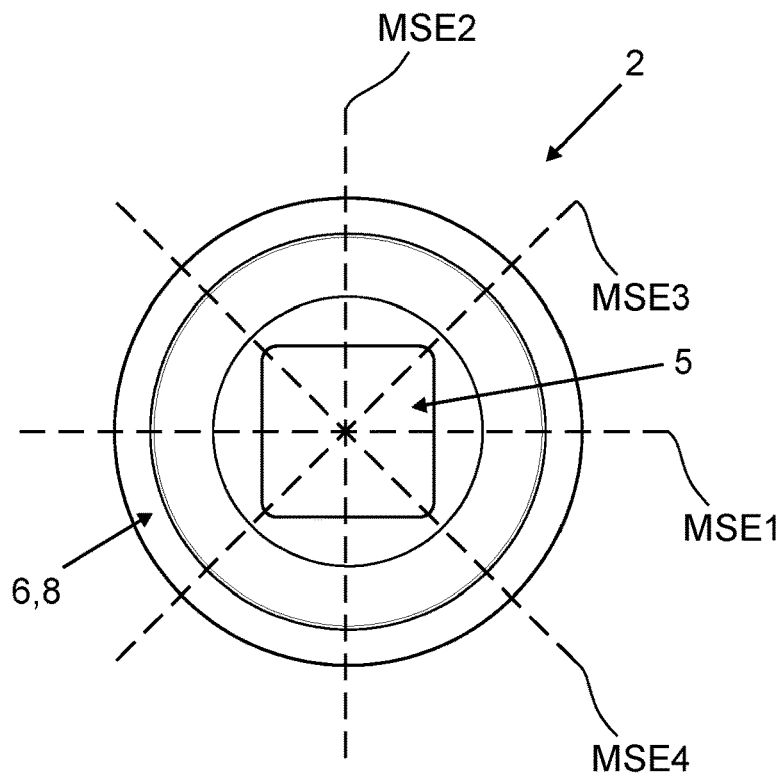
FIG. 4 is a top view of a measuring tube with a square measuring section.
Figure 5:
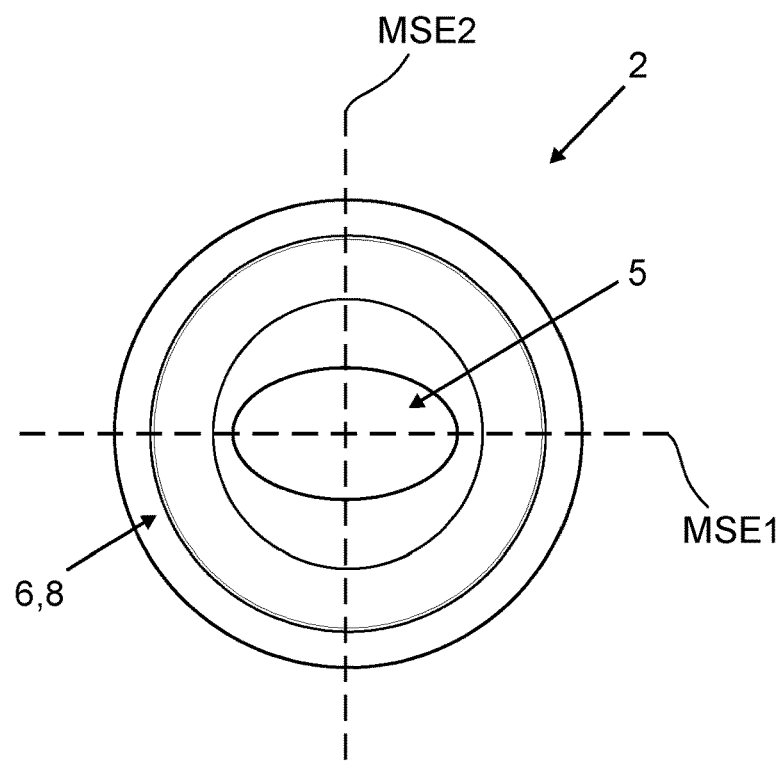
FIG. 5 is a top view of a measuring tube with an oval measuring section.
Figure 6:
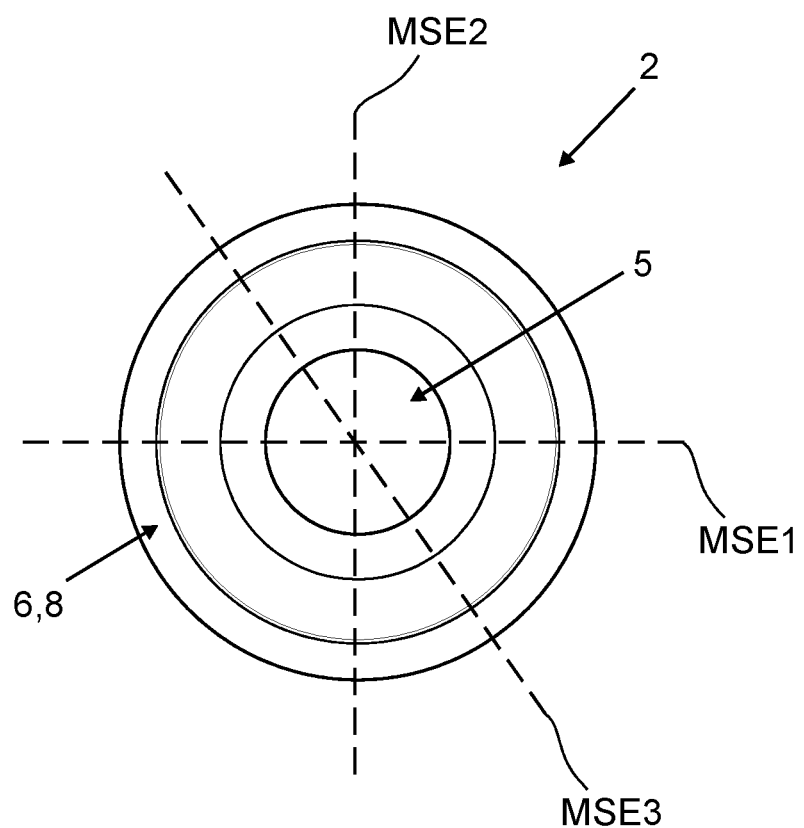
FIG. 6 is a top view of a measuring tube with a round measuring section.

FIGS. 4-6 show schematic top views of the measuring tube 2. The view into the outlet end 8 of the outflow section 6 can be seen. The outflow section 6 has a round cross section on its outlet end 8. Since the cross section decreases towards the measuring section 5, FIGS. 4-6 also show the cross section of the measuring section 5. FIGS. 4-6 serve to illustrate different measuring section symmetry planes MSE for different measuring section cross sections.

FIG. 4 shows a measuring tube 2 with a measuring section 5 with a square cross section. The corners of measuring section 5 are slightly rounded. The square measuring section has a total of four measuring section symmetry planes MSE1, MSE2, MSE3 and MSE4, wherein the measuring section symmetry planes MSE1 and MSE2 each lie parallel to a side of the cross section, whereas the measuring section symmetry planes MSE3 and MSE4 intersect the measuring section diagonally.

The measuring tube 2 shown in FIG. 5 has a measuring section 5 with an oval cross section. The oval measuring section has a total of two measuring section symmetry planes MSE1 and MSE2, with the measuring section symmetry plane MSE1 intersecting the cross section along its long side and the measuring section symmetry plane MSE2 intersecting the cross section along its short side.

FIG. 6 shows a measuring tube 2 with a measuring section 5 having a round cross section. The round measuring section 5 has an infinite number of measuring section symmetry planes MSE, wherein three measuring section symmetry planes MSE1, MSE2 and MSE3 are shown as examples.

The invention claimed is:

1. A magnetic-inductive flowmeter for determining the flow of a medium, comprising:
 a measuring tube for guiding the medium along a longitudinal axis of the measuring tube and having two electrodes for tapping a measuring voltage induced in the medium,
 wherein the measuring tube has an inflow section, a measuring section and an outflow section lying, one following the other, on said longitudinal axis as viewed in a flow direction of the medium,
 wherein the inflow section has a cross section which decreases in the flow direction,
 wherein the measuring section has a constant cross section and is formed symmetrically with respect to a measuring section symmetry plane,
 wherein the measuring section symmetry plane runs parallel to the longitudinal axis of the measuring tube,
 wherein the outflow section has a cross section which increases in the flow direction,
 wherein the outflow section is formed at least partially asymmetrically with respect to the measuring section symmetry plane, and
 wherein the asymmetry is formed by a step-shaped elevation that reduces the cross section in the outflow section.

2. The magnetic-inductive flowmeter according to claim 1, wherein the measuring section has a rectangular cross section and wherein the measuring section symmetry plane is parallel to a long side of the cross section.

3. The magnetic-inductive flowmeter according to claim 1, wherein the measuring section has a square cross section and wherein the measuring section symmetry plane is parallel to one side of the cross section.

4. The magnetic-inductive flowmeter according to claim 1, wherein the asymmetry is formed additionally by the measuring section being offset relative to the inflow section and relative to the outflow section in a direction perpendicular to the measuring section symmetry plane.

5. The magnetic-inductive flowmeter according to claim 1, wherein the asymmetry is formed over the entire circumference of the outflow section, the step-shaped elevation being thinner on a first side of the measuring section symmetry plane than on a second side of the measuring section symmetry plane.

6. The magnetic-inductive flowmeter according to claim 1, wherein the inflow section is at least partially asymmetrical with respect to the measuring section symmetry plane.

7. The magnetic-inductive flowmeter according to claim 1, wherein the asymmetry is additionally formed by arranging an insert element in the outflow section.

8. A magnetic-inductive flowmeter for determining the flow of a medium, comprising:
 a measuring tube for guiding the medium along a longitudinal axis of the measuring tube and having two electrodes for tapping a measuring voltage induced in the medium,
 wherein the measuring tube has an inflow section, a measuring section and an outflow section lying, one following the other, on said longitudinal axis as viewed in a flow direction of the medium,
 wherein the inflow section has a cross section which decreases in the flow direction,
 wherein the measuring section has a constant cross section and is formed symmetrically with respect to a measuring section symmetry plane,
 wherein the measuring section symmetry plane runs parallel to the longitudinal axis of the measuring tube,
 wherein the outflow section has a cross section which increases in the flow direction,
 wherein the outflow section is formed at least partially asymmetrically with respect to the measuring section symmetry plane, and
 wherein the asymmetry is formed by a bulge reducing the cross section in the outflow section.

9. The magnetic-inductive flowmeter according to claim 8, wherein the measuring section has a rectangular cross section and wherein the measuring section symmetry plane is parallel to a long side of the cross section.

10. The magnetic-inductive flowmeter according to claim 8, wherein the measuring section has a square cross section and wherein the measuring section symmetry plane is parallel to one side of the cross section.

11. The magnetic-inductive flowmeter according to claim 8, wherein the asymmetry is formed additionally by the measuring section being offset relative to the inflow section and relative to the outflow section in a direction perpendicular to the measuring section symmetry plane.

12. The magnetic-inductive flowmeter according to claim 8, wherein the inflow section is at least partially asymmetrical with respect to the measuring section symmetry plane.

13. The magnetic-inductive flowmeter according to claim 8, wherein the asymmetry is additionally formed by arranging an insert element in the outflow section.

14. A magnetic-inductive flowmeter for determining the flow of a medium, comprising:
   a measuring tube for guiding the medium along a longitudinal axis of the measuring tube and having two electrodes for tapping a measuring voltage induced in the medium,
   wherein the measuring tube has an inflow section, a measuring section and an outflow section lying, one following the other, on said longitudinal axis as viewed in a flow direction of the medium,
   wherein the inflow section has a cross section which decreases in the flow direction,
   wherein the measuring section has a constant cross section and is formed symmetrically with respect to a measuring section symmetry plane,
   wherein the measuring section symmetry plane runs parallel to the longitudinal axis of the measuring tube,
   wherein the outflow section has a cross section which increases in the flow direction, and
   wherein the outflow section is formed at least partially asymmetrically with respect to the measuring section symmetry plane, and wherein the asymmetry is formed by arranging an insert element in the outflow section.

15. The magnetic-inductive flowmeter according to claim 14, wherein the measuring section has a rectangular cross section and wherein the measuring section symmetry plane is parallel to a long side of the cross section.

16. The magnetic-inductive flowmeter according to claim 14, wherein the measuring section has a square cross section and wherein the measuring section symmetry plane is parallel to one side of the cross section.

17. The magnetic-inductive flowmeter according to claim 14, wherein the asymmetry is formed additionally by the measuring section being offset relative to the inflow section and relative to the outflow section in a direction perpendicular to the measuring section symmetry plane.

18. The magnetic-inductive flowmeter according to claim 14, wherein the inflow section is at least partially asymmetrical with respect to the measuring section symmetry plane.

* * * * *